United States Patent Office 3,482,623
Patented Dec. 9, 1969

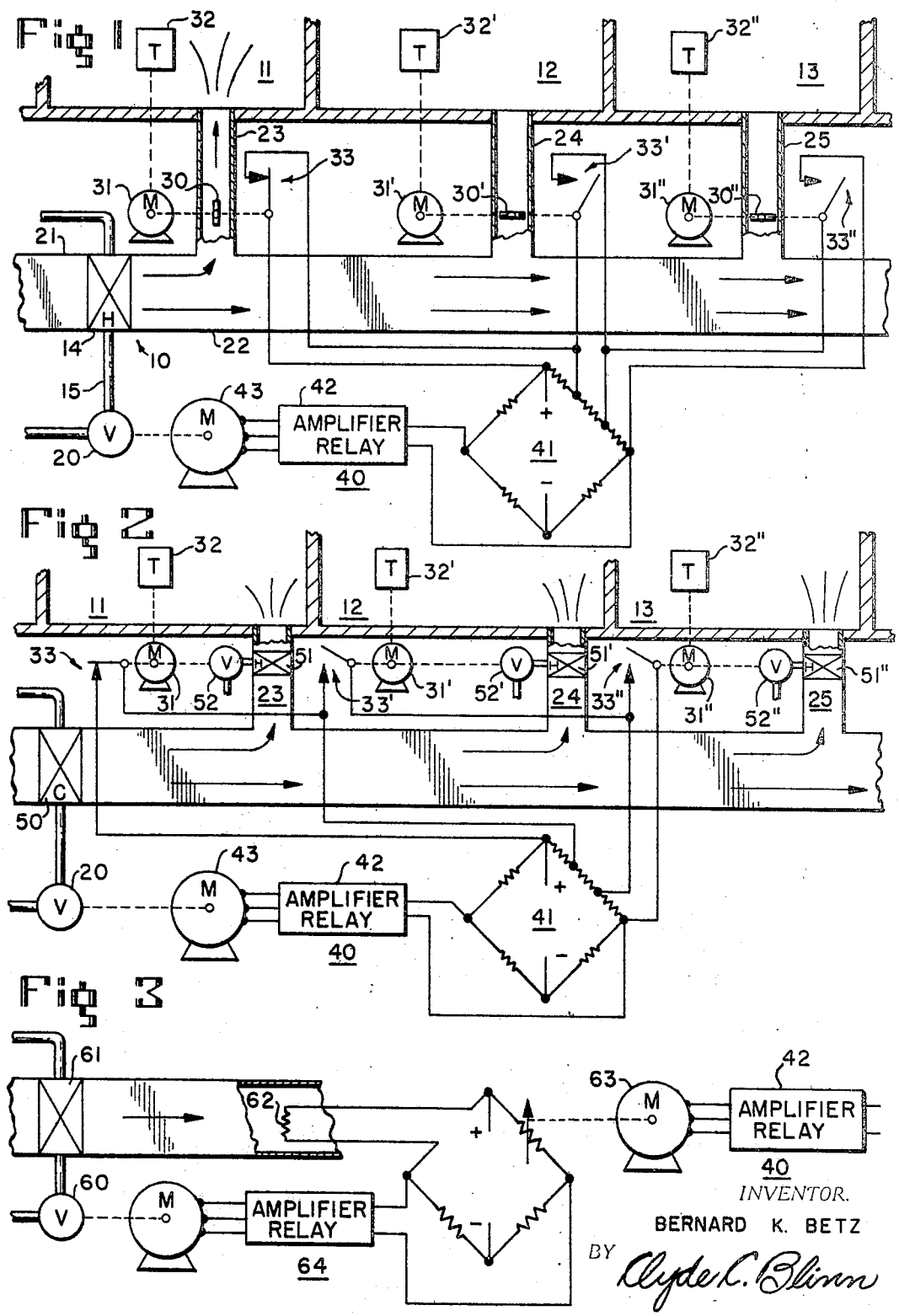

3,482,623
ZONE TEMPERATURE CONTROL SYSTEM
Bernard K. Betz, Hopkins, Minn., assignor to Honeywell Inc., Minneapolis, Minn., a corporation of Delaware
Filed Feb. 23, 1968, Ser. No. 707,686
Int. Cl. F24f 3/00
U.S. Cl. 165—22                              9 Claims

ABSTRACT OF THE DISCLOSURE

A multizone temperature control system wherein the temperature of the air supplied from a central source is gradually increased or decreased by an output from the individual zone control systems to maintain the temperature of the air at an optimum temperature just adequately satisfying the zone with largest temperature conditioning load.

BACKGROUND OF THE INVENTION

In multizone temperature control systems the need of a means to adjust the temperature of the air from a central source to satisfy the zone having the largest temperature conditioning load has been long recognized. In some systems the temperature of the air from the central source is adjusted by the summation of the needs of each individual zone while in other systems the temperature responsive device of the zone having the greatest conditioning load is placed in control of the temperature of the air from the central source. In neither of these systems nor any others is the temperature of the air from the central source maintained at a level just adequate to supply the conditioning load of the zone having the largest temperature conditioning load with the system maintaining the desired air flow to all zones.

SUMMARY OF THE INVENTION

The present invention is concerned with the multiprocess control system wherein a condition of the conditioned medium from a central source is gradually increased or decreased by an output signal indicative of the state of the individual process control systems to maintain the condition of the medium from the central source at a condition level just adequately satisfying the processes; therefore, operating the entire system in its most optimum manner. Specifically, in a system where each of the zones of a multizone temperature control system has a control system made up of a temperature responsive means and a flow control means, a position responsive means associated with each of the flow control means is connected to a controller for adjusting the temperature of the air from the central source so that the temperature is maintained at a value to have at least one of the flow control means of the zones almost fully open.

BRIEF DESCRIPTION OF THE DRAWING

FIGURE 1 is a schematic representation of a multizone temperature control system wherein air from a central source is delivered to zones under the control of individual zone dampers which are positioned by zone thermostats. The temperature of the air from the central source is adjusted by a controller which receives a signal indicative of the damper position to maintain the temperature from this source so that at least one of the zone control dampers is almost wide open.

FIGURE 2 is a zone control system wherein cool air is supplied from a central source and individual zone reheat means controlled in response to zone thermostats maintains the zone temperature. A controller for adjusting the temperature of air from the central source is controlled by switches attached to the reheat heater valves to adjust the temperature of the central source to maintain at least one of the reheat heater valves almost fully closed.

FIGURE 3 is a controller for controlling the temperature of the air from the central source wherein the temperature control point of the controller is adjusted by a motor.

DESCRIPTION

Referring to FIGURE 1, a zone control system is shown having a central source 10 of temperature conditioned medium or air supplying air or medium to a plurality of processes or zones 11, 12 and 13. The central source is a heat exchanger or coil 14 to which hot water is supplied through a pipe 15 depending upon the position of a valve 20. Air passes through coil 14 from a return duct 21 to a supply duct 22 which is connected to the individual zone supply ducts 23, 24 and 25.

Connected in each of the zone supply ducts, such as duct 23, is a damper or flow control means 30 controlled by a reversible motor 31 in response to the output of a temperature responsive means or thermostat 32 located in zone 11. Associated with damper 30 is a position responsive means or output switch 33 which is shown in the closed circuit position when damper 30 is in a predetermined state representative of the zone load or almost wide open. The other zones 12 and 13 contain similar apparatus which for explanation purposes is shown with corresponding numbers having a prime and a double-prime for the respective zones 12 and 13.

A conventional controller 40 for valve 20 for establishing the temperature of air source 10 comprises a bridge circuit 41, an amplifier relay 42 and a reversible motor 43 which is connected to control valve 20. The amplifier and motor are of the type disclosed in the Albert P. Upton Patent 2,423,534. With the bridge circuit connected to a source of power and all the switches 33, 33' and 33" open to have the maximum resistance in the bridge circuit, controller 40 energizes motor 43 to run in one direction. With at least one of the resistance elements in the bridge circuit shorted out by the closure of any one of the switches, such as switch 33, controller 40 energizes motor 43 to run in the opposite direction.

With such a system, the temperature of the air from the central source is gradually increased or decreased depending upon the direction in which motor 43 is running. The rate at which the temperature of the air changes depends upon the rate of adjustment of the controller 40. With all of the dampers 30, 30' and 30" either closed or partly closed, controller 40 is energized so that motor 43 is gradually moving valve 20 in a closed direction to reduce the flow of water to coil 14 and thus gradually decrease the temperature of the air from the central source. As the zone thermostats become unsatisfied and the dampers are moved toward an open position, upon the closure of one of the switches 33, 33' or 3", bridge circuit 41 is modified so that controller 40 reverses and motor 43 gradualy moves valve 20 in an open direction to gradually increase the temperature of the air from the central source. With controller 40 having a slow operating motor 43 to gradually reposition valve 20, the temperature of the air from the central source is maintaineed at a level so that at least one of the dampers is maintained almost at a maximum position or wide open. The temperature of the air from the central source is maintained at or reset to an optimum temperature to adequately supply the temperature conditioning load of the zone having the largest temperature conditioning load.

Referring to FIGURE 2, a similar zone control system is shown having a controller 40 for positioning a valve 20 delivering cold water to a heat exchanger or coil 50 which supplies air to a plurality of zones 11, 12 and 13. Connected in each supply duct, such as duct 23, for delivering air to the zones is a heat exchanger or reheat coil 51. Valve 52 controls the flow of hot water to coil 51 depending upon the position of reversible motor 31 controlled in response to zone thermostat 32. Associated with motor 31 is a position responsive means or output switch 33 which provides a closed output circuit when valve 52 is almost fully closed.

Associated with controller 40 is a bridge circuit 41 containing resistors which are shorted when the switches 33, 33' and 33'' are closed. The output of the bridge controls the reversible motor 43 to position valve 20. As air temperature from the central source gradually increases, to maintain a predetermined temperature in each of the zones, thermostats 32 will decrease the flow of hot water to the reheat coils 51. When one of zone reheat coils is almost closed, which is representative of a then maximum cooling load on that zone, the associated switch 33 closes to short out an element in the bridge circuit 41 and reverse the operation of motor 43 to gradually move valve 20 in an open direction to decrease the temperature of the air supplied from the central source.

In the systems of FIGURES 1 and 2, the zone having the largest temperature conditioning load will alternately open and close its associated switch 33 to result in cycling of the controller 40 to gradually increase and decrease the temperature of the air from a central source to maintain or establish the temperature at an optimum temperature to adequately supply the zone with the largest temperature conditioning load and maintain at least one of the dampers or reheat coil valves in a predetermined position. In such a dynamic system, no particular fixed operation conditions will exist; however for selected load conditions in each of the zones, the zone having the largest load will cause controller 40 to maintain a relatively fixed optimum temperature at the central source.

FIGURE 3 discloses a conventional valve 60 for controlling the flow of heating or cooling medium to heat exchanger or coil 61. A temperature responsive element 62 is connected to a conventional controller 64 for controlling the valve to maintain a predetermined temperature at element 62 and thus a predetermined air temperature from a central source. Reversible motor 62 is connected to controller 64 for resetting the control point of the controller 64 is maintained at element 62. Motor 63 would be connected to the output of relay 42 or controller 40 to be adjusted by the output from the zone control systems. When the embodiment shown in FIGURE 3 is used in the systems of FIGURE 1 or 2, the temperature from the central source is maintained at a predetermined value depending upon the temperature of the element 62; and, the control point of the controller 64 is gradually adjusted by the outputs from the zone control systems to increase or decrease the temperature maintained at element 62.

The embodiments of the invention in which an exclusive property or right is claimed are defined as follows:

1. In a multiprocess control system wherein each process receives conditioned medium from a central source, comprising;
    a plurality of condition control systems for controlling a condition in each of a plurality of processes, said control systems each having output means providing an output indicative of a predetermined state of said control system,
    first means for establishing a condition of the medium from the central source,
    second means connected to said first means for gradually changing the condition of the medium from the central source at a rate limited by said second means, and
    means connecting said output means of each of said control systems to said second means to control the direction of gradually changing the condition.

2. In the control system of claim 1, wherein each process is a zone of a plurality of zones all of which receive temperature conditioned air from the central source, and
    wherein each condition control system is a temperature control system for controlling the temperature in one of the zones.

3. In the system of claim 2 wherein each of said plurality of control systems comprises,
    temperature responsive means responsive to the temperature in a zone,
    flow control means connected to said temperature responsive means for controlling the flow of temperature conditioned medium from the central source to the zone, and
    position responsive means associated with said flow control means as said output means for providing said output for gradually increasing the temperature of the medium from the central source when at least one of said flow control means is in a predetermined position and for gradually decreasing the temperature of the medium from the central source when none of said position responsive means are in said predetermined position.

4. In a system of claim 3 wherein,
    said flow control means controls the flow of temperature conditioned air from the central source to the zones,
    said position responsive means is a switch means connected to said flow control means and
    said second means comprises circuit means which is unbalanced in one direction when any one of said switch means are closed and unbalanced in an opposite direction when none of said switch means are closed to change said first means in one direction or the opposite direction to gradually reset the temperature of the air from central source to a temperature for the most optimum operation.

5. In the system of claim 2 wherein the central source supplies cooled air and each zone has reheat means for heating the cooled air, each of said plurality of control systems comprises;
    temperature responsive means responsive to the temperature in a zone,
    control means connected to said temperature responsive means for controlling the output of a reheat means for adding heat to cooled air delivered from the central source to the zones, and
    means representative of the output of the reheat means to establish the temperature of the air from the central source.

6. In a system of claim 5 wherein;
    said means representative of the output of said reheat means comprises means which is in a first state when said reheat means is not adding heat to the cool air whereby, upon any one of said reheat means not adding heat to said cold air from the central source the first means is operated and the temperature of the air is gradually decreased and upon all of said reheat means adding heat to the air from the central source said first means is operated and the temperature of the air from the central source is gradually increased.

7. In the system of claim 2 wherein;
    said first means comprises temperature control means for controlling the temperature of the medium from the central source at a predetermined value, and
    said second means comprises an adjusting means connected to said temperature control means for changing said predetermined value gradually either upward or downward.

8. In the system of claim 2 wherein air from the central source is supplied to each of the zones and the temperature of the air from the central source is established at a value for the most optimum operation,
    wherein said plurality of control systems each comprises a flow control means for controlling the flow of air to each zone to maintain the temperature, said flow control means having position responsive means actuated when the flow of the air to the zone is almost a maximum value, and wherein said second means comprises a reversible controller connected to said position responsive means of each flow control means for driving said controller in one direction when at least one flow control means is almost at a maximum value of flow and for driving said controller in an opposite direction when none of said flow control means are at a maximum value.

9. In the system of claim 2 wherein cool air from the central source is supplied to each of the zones and the temperature of the air from the central cooling source is controlled at a value to maintain the most optimum operation and maximum air flow to each zone for the particular existing load distribution between zones, wherein said plurality of control systems each comprises reheat means for reheating the cool air from the central cooling source, said reheat means having position responsive means actuated when the reheat means has a predetermined output, and wherein said second means comprises a reversible control means connected to said position responsive means of each reheat means for driving said control means in one direction to gradually change the temperature of the cool air from the central source in one direction when one reheat means has said predetermined output and for driving said control means in an opposite direction to gradually change the temperature of the cool air from the central source in an opposite direction when none of the reheat means have said predetermined output.

References Cited

UNITED STATES PATENTS 2,885,187    5/1959    Myck _____ 165—22

ROBERT A. O'LEARY, Primary Examiner

CHARLES SUKALO, Assistant Examiner

U.S. Cl. X.R.

165—30